Oct. 16, 1962      C. KRANC ET AL      3,058,163
METHOD FOR RESHAPING A DIPPED CANDLE
Filed Nov. 14, 1960      2 Sheets-Sheet 1
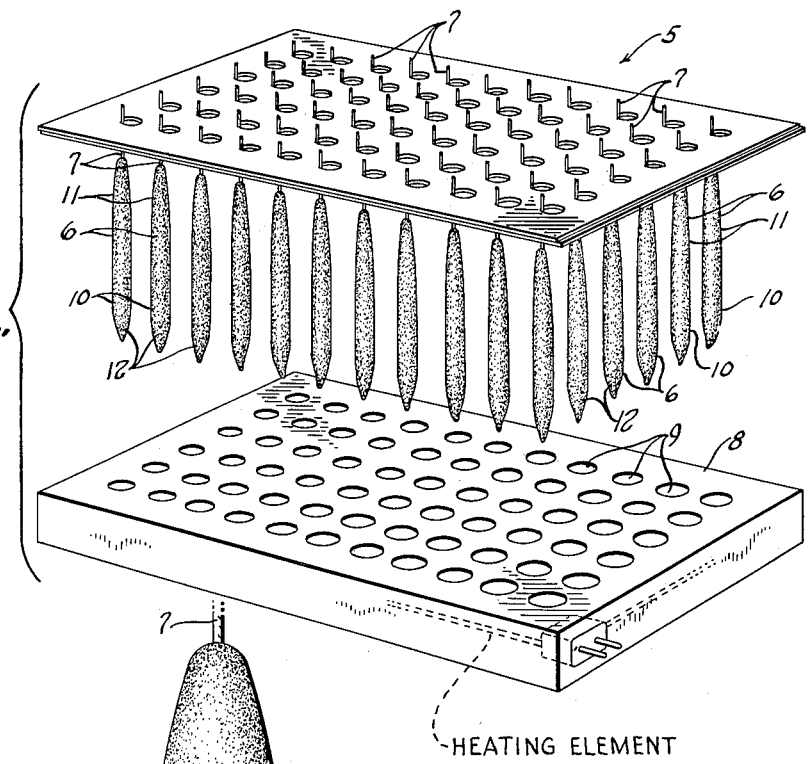
Fig. 1.
HEATING ELEMENT
Fig. 2.
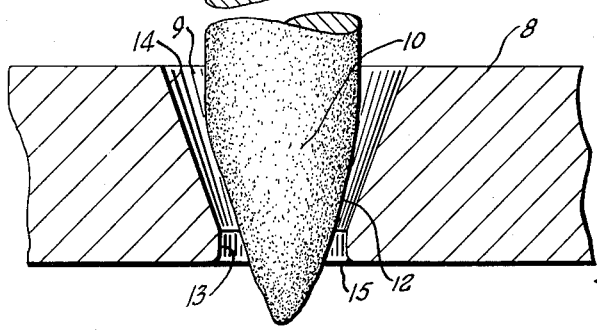
Inventors
Casimir Kranc
Arvid Carrick
By
Attorney Oct. 16, 1962     C. KRANC ET AL     3,058,163
METHOD FOR RESHAPING A DIPPED CANDLE
Filed Nov. 14, 1960     2 Sheets-Sheet 2
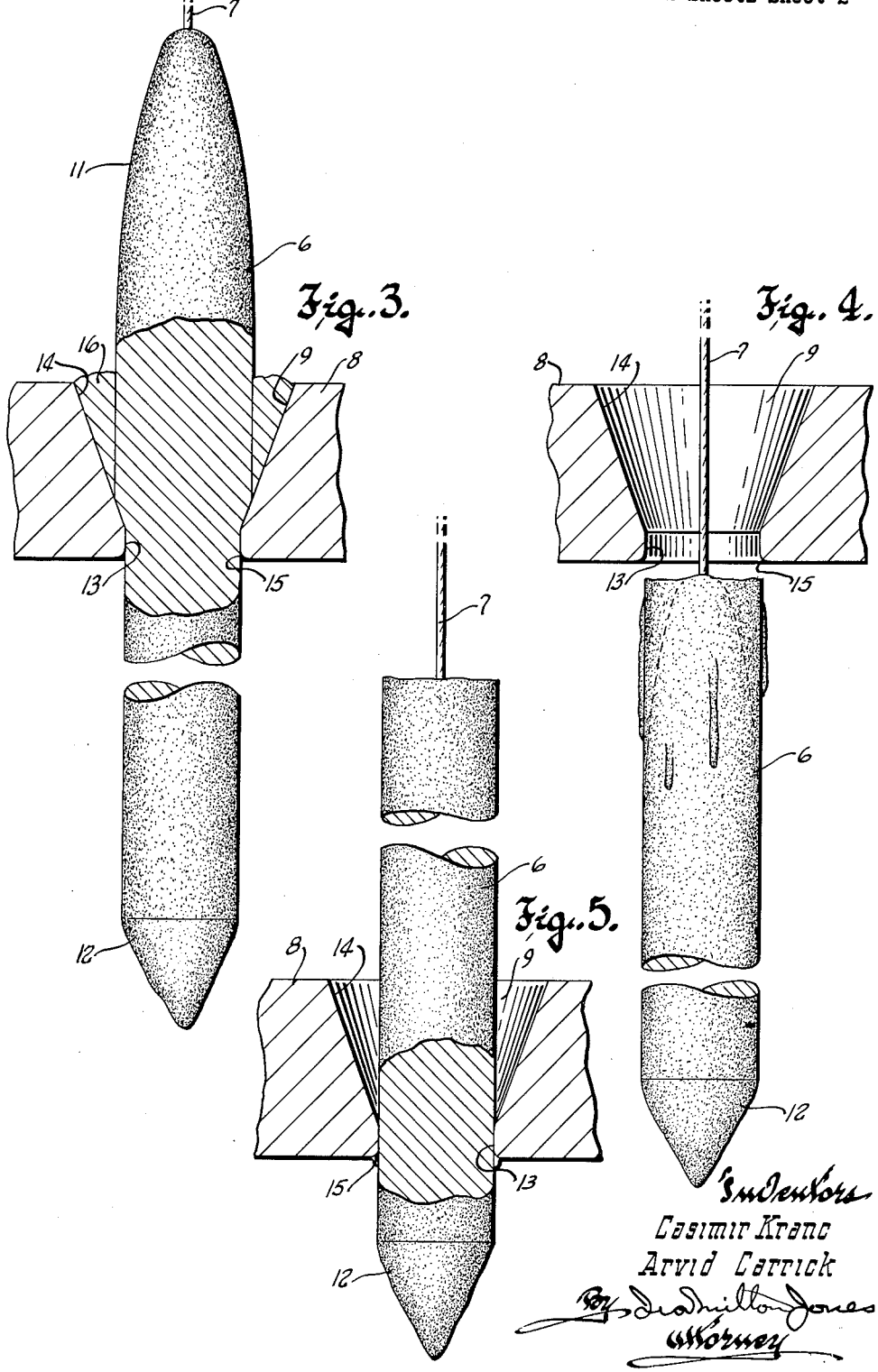
Inventors
Casimir Kranc
Arvid Carrick

United States Patent Office 3,058,163
Patented Oct. 16, 1962

3,058,163
METHOD FOR RESHAPING A DIPPED CANDLE
Casimir Kranc and Arvid Carrick, Oshkosh, Wis., assignors to Victrylite Candle Company, Oshkosh, Wis., a corporation of Wisconsin
Filed Nov. 14, 1960, Ser. No. 69,031
3 Claims. (Cl. 18—48)

This invention relates to a method for reshaping tapering dipped candles to provide them with uniform diameters along their lengths, and to render them cylindrical and untapered.

Very long candles, used by churches and the like, are most economically formed by the dipping process because the demand for such candles is not great enough to warrant the capital investment required for a molding machine capable of producing candles of the larger sizes. Not only would a machine for molding candles of 30-inch or greater lengths be substantially more expensive than machines for molding candles of the more conventional household sizes, but the larger machine would also occupy a great deal of space and would be cumbersome and difficult to operate. In view of the relatively small demand for large size candles, it is therefore not considered economically feasible to make them by the use of a molding machine, and the usual practice has been to form the longer candles by the dipping process. However, the shapes of dipped candles cannot be accurately controlled because of the nature of the dipping process, and consequently dipped candles are not all uniform with one another. Moreover, the diameter of a dipped candle varies substantially from point to point along its length. It is widest at a point some distance below its mid portion, and has a gradual taper from this point to its upper end and a more abrupt taper downwardly to its lower end.

For many purposes it is considered desirable for large candles to be uniform in size and shape, and therefore the taper and nonuniformity of dipped candles are often felt to be objectionable. Heretofore, however, it has been regarded as inevitable that large candles should be tapered if they were not to be unduly expensive, since no method or means was available for producing large, perfectly cylindrical candles at low cost.

With these facts in mind, it is an object of the present invention to provide a method for reshaping tapered dipped candles to render them cylindrical and untapered along their lengths, so that large candles can be produced which are uniform in size and shape and which combine the economy of dipped candles with the desirable appearance of molded candles, enabling very long cylindrical candles to be manufactured without the need for cumbersome and expensive molding machines.

Another object of this invention resides in the provision of a method for quickly and inexpensively reshaping tapering dipped candles to render them closely uniform in diameter as well as perfectly cylindrical in shape, to enable all of the dipped candles in a group thereof to be made identical in appearance without undue waste of candle body material, so that there is no sacrifice of the economy obtained by producing very long candles by the dipping process.

Still another object of this invention resides in the provision of a simple method for reshaping dipped candles to render them cylindrical and untapered along their lengths, and whereby the excess wax at the widest portion of the candle is redistributed along the length of the candle to build up those portions of the candle which are of smaller diameter.

The invention also has as an object the provision of a method for providing dipped candles with a smooth, even and substantially glossy surface as well as with a uniform cylindrical shape.

With the above and other objects in view which will appear as the description proceeds, this invention resides in the novel method as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 1 is a more or less diagrammatic perspective view of an apparatus for practicing this invention shown together with a group of dipped candles about to be reshaped thereby;

FIGURE 2 is a fragmentary longitudinal sectional sectional view through a candle reforming member used to carry out this invention, with a dipped candle shown entering the same just prior to being reshaped by the apparatus;

FIGURE 3 is a view similar to FIGURE 2, but showing the candle at an intermediate stage of downward passage through the reforming member;

FIGURE 4 is a view similar to FIGURE 2, but showing the candle after having passed downwardly through the reforming member, and in position to be passed back upwardly therethrough; and FIGURE 5 is a view similar to FIGURE 2, but showing the candle almost completely reshaped and in the course of completing its passage back up through the reforming member.

Referring now more particularly to the accompanying drawings, the numeral 5 designates generally a multiple candle carrier or dipping board from which a group of dipped candles 6 are suspended by their wicks 7. The dipping board may be of any suitable construction, and may be one of the carriers employed in dipping machines to repeatedly dip a group of wicks into a wax bath until the bodies of wax accumulated on the wicks is large enough. For the purposes of this invention the only essential characteristic of the dipping board is that it will simultaneously grip and also simultaneously release a number of candle wicks.

The details of the dipping process are well known to those skilled in the art, who also appreciate that this process lends itself to the production of very long candles much more economically than such candles could be produced by molding.

In practicing the method of this invention, which may be said to begin at the point where the conventional dipping process is completed, the entire dipping board or carrier 5, with the candles attached thereto, is removed bodily from the dipping machine to be used in conjunction with a reforming or die member 8 by means of which the reshaping of the dipped candles is accomplished.

The reforming or die member 8 comprises a metal plate or the like through which extend a plurality of forming bores 9. The plate is supported in a horizontal position when in use to dispose the axes of its bores 9 upright, and the spacing of the bores 9 corresponds to the spacing of the wick engaging means in the carrier 5, so that when the carrier 5 is disposed horizontally above the reforming member each of the candles depending from the carrier can be coaxially aligned with one of the bores in the reforming member. The reforming member is also provided with a suitable means for heating it to a temperature above the melting point of the wax of which the candle bodies are formed, such as, for example, electrically resistance elements connectable with a suitable source of current.

Due to the manner in which dipped candles are made, the wax body of each of the candles 6 suspended from the carrier 5 has a substantial taper, being widest at a point 10 a small distance above its bottom and converging gradually upwardly, as at 11, toward its wick 7. The bottom portion 12 of the dipped candle converges more abruptly downwardly from its widest point 10.

To effect a redistribution of the wax comprising the candle body, each bore 9 in the reforming member has a substantially cylindrical medial portion 13, the diameter of which defines the diameter that the reshaped candle will have along substantially its entire length. Specifically, the diameter of the medial portion 13 of each bore is smaller than the widest portion 10 of the tapered candle, but larger than the diameter of the tapering portion 11 at some distance above the widest point 10. From its cylindrical medial portion 13 each bore diverges abruptly upwardly, as at 14, and the upper end of the bore thus has a substantially larger diameter than the widest portion 10 of the tapered candle. In other words, each of the bores 9 may be said to be substantially funnel shaped. At its lower end each bore is outwardly diverged or chamfered, as at 15.

In using the apparatus to practice this invention, a carrier 5, having dipped candles secured therein, is so disposed above the reforming or die member 8 that all of the candles secured in the carrier are substantially coaxial with the bores 9 in the reforming member. With the reforming member heated, the carrier is lowered to cause each candle to enter one of the bores, as illustrated in FIGURE 2. As the description proceeds, it will be apparent that each of the bores 9 provides, in effect, a reforming die by which a candle is reshaped by a redistribution of wax at the surface of its body.

As the widest portion 10 of the candle is brought into contact with the cylindrical portion 13 of the bore during passage of the candle downwardly through the bore, the wax at the surface of the candle body is of course heated and softened, and the excess wax is scraped off of the widest portion of the candle and forced upwardly into the divergent portion 14 of the bore, which thus forms a receptacle in which a pool 16 of such wax is stored, and where it is kept soft, all as shown in FIGURE 3. It will be observed that the candle body fills the small diameter portion 13 of the bore and serves as a plug which prevents wax from flowing downwardly out of the receptacle portion 14 of the bore.

As the candle is moved farther downwardly in the reforming die, and the uppermost small diameter tapered portion 11 of the candle enters the medial portion 13 of the bore, the pool 16 of molten candle body wax which has accumulated in the receptacle portion 14 of the bore is redeposited upon the candle body so as to build up its diameter to that of the medial portion 13 of the bore, all as shown in FIGURE 4.

Obviously the downward passage of the candles through the bores or reforming dies 9 is effected by simply lowering the carrier 5 straight down, with a translatory motion. Preferably the small diameter portion 13 of each bore has a substantial axial length so that it will afford a measure of guidance to the candle in holding it upright. No downward force need be exerted upon the candles, other than that provided by their own weight, because the wax at the surfaces of their bodies is redistributed while in very soft condition due to the heating of the reforming member. With very little experience an operator will learn the correct rate at which to lower the candles through the die member, to avoid, on the one hand, failure to soften the surface wax sufficiently and to avoid, on the other hand, excessive softening of the wax.

Upon emerging downwardly from the bore in the reforming member, the upper portion of the candle body may not be perfectly cylindrical due to the accumulation of small residual amounts of wax thereon, dripped down from the upper receptacle portion 14 of the bore. To remove these small accumulations of wax, which tend to form unsightly lumps on the candle, and to insure that the candle body will be perfectly cylindrical, the candle is drawn back upwardly through the bore, as shown in FIGURE 5, by raising the carrier 5 straight up, back to its initial position.

It will be apparent that the chamfer or bevel 15 at the bottom of the bore facilitates drawing the candle back upwardly through the reforming die and assures that when the candle emerges from its upward pass it will have a well polished surface of pleasing appearance as well as having a uniform diameter along its entire length.

From the foregoing description, taken together with the accompanying drawings, it will be readily apparent that this invention provides a method for reshaping dipped candles to render them uniform in diameter, cylindrical and untapered along substantially their entire lengths, and to provide them with an attractive and well polished surface by which their appearance is greatly improved; and it will also be apparent that the invention provides a method for manufacturing very large candles of pleasing cylindrical shape without sacrificing the advantages inherent in the dipping process.

What is claimed is:

1. The method of producing a very long candle having a uniform diameter along substantially its entire length, which method is characterized by: moving a candle formed by the dipping process, held upright with its wick end uppermost, axially downwardly through a reforming member having a vertical bore with a diameter at its upper end which is substantially larger than that of the widest portion of the dipped candle body and which converges downwardly to a diameter less than that of said widest portion of the dipped candle and to a diameter equal to that desired for the reshaped candle; as the candle is moved downwardly through the reforming member, heating the surface of the candle body to melt the wax thereof, so that excess wax accumulates in the upper portion of the bore in the reforming member to be redeposited on portions of the dipped candle body having a diameter less than that of the smallest diameter portion of the bore in the reforming member; and, after passing the entire candle axially through the reforming member, drawing the candle axially back up through the reforming member to smooth the entire surface of the candle.

2. The method of removing wax from the widest portion of a tapering dipped candle and redepositing it on smaller diameter portions thereof to provide the candle with a uniform diameter along substantially its entire length, which method comprises: moving a tapering candle, in upright position, wick end uppermost, axially downwardly through a vertical bore in a shaping member, which bore has a minimum diameter near its lower end that corresponds to the desired diameter of the candle and diverges upwardly from said minimum diameter to a diameter at its upper end which is substantially larger than the largest diameter of the tapering candle; heating the shaping member while the candle is moved therethrough to melt wax at the surface of the candle and cause excess wax from portions of the candle body that are wider than the minimum diameter portion of the bore to accumulate in the upwardly divergent portion of the bore, and to enable such accumulated wax to be redeposited on portions of the candle body which have a smaller diameter than the minimum diameter portion of the bore; and, after the entire candle has been passed downwardly through the shaping member, moving it back up axially through the bore in the shaping member to smooth its surface.

3. The method of reshaping tapering dipped candles by passing them through bores in a heated die to impart to the candles a uniform diameter along their entire length, which method is characterized by: suspending a plurality of tapering dipped candles which are wider than the desired uniform diameter for part of their length and narrower than the desired diameter for another part thereof, from a dipping board by which the candles have been held during dipping, with the dipping board disposed substantially horizontally so that the candles are upright and have their wick ends uppermost; lowering the dipping board translatingly over a heated shaping member defining a plurality of upwardly diverging tapered bores, the minimum diameter of which corresponds to the desired uniform diameter of the finished candles and the upper open ends of which are substantially larger than the widest parts of the tapering candles, and the axes of which are vertical and spaced apart by distances corresponding to the spacing of the axes of the candles held by the dipping board, and by such lowering of the dipping board passing all of the candles thereon simultaneously downwardly through said bores in the shaping member to thereby melt wax at the surface of the wider portions of the candles and cause excess wax from said wider portions of the candles to accumulate in the upwardly diverigng bores for deposition onto the narrower parts of the candles as said narrower parts pass downwardly through the bores; and after the dipping board has been thus lowered a sufficient distance to pass the full length of the candles through the bores in the shaping member, raising the dipping board to draw the candles back up through the shaping member to polish them and free them from the shaping member.

References Cited in the file of this patent

UNITED STATES PATENTS

| | | |
|---|---|---|
| 301,328 | Baumer | July 1, 1884 |
| 421,700 | Grieser | Feb. 18, 1890 |
| 1,482,000 | Engman | Jan. 29, 1924 |
| 2,052,005 | Root | Aug. 25, 1936 |